(12) United States Patent
Amemiya et al.

(10) Patent No.: US 6,665,176 B2
(45) Date of Patent: Dec. 16, 2003

(54) ELECTRONIC DEVICE

(75) Inventors: Shinichi Amemiya, Tokyo (JP); Osamu Furuta, Tokyo (JP); Yoshinori Sakamoto, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 5 days.

(21) Appl. No.: 10/162,273

(22) Filed: Jun. 3, 2002

(65) Prior Publication Data

US 2002/0181193 A1 Dec. 5, 2002

(30) Foreign Application Priority Data

Jun. 4, 2001 (JP) ........................................ 2001-167669

(51) Int. Cl.[7] ................................................ G06F 1/16
(52) U.S. Cl. .................... 361/681; 361/680; 312/223.2; 206/576; 190/115
(58) Field of Search ................................. 361/681, 680, 361/682–687, 679, 724–727; 206/576, 320; 190/109, 115; 312/223.2; 248/917

(56) References Cited

U.S. PATENT DOCUMENTS

| 4,294,496 A | 10/1981 | Murez ..................... 312/208.3 |
|---|---|---|
| 4,604,064 A * | 8/1986 | Boehm et al. .............. 434/224 |
| 4,796,735 A | 1/1989 | Horiuchi ..................... 190/109 |
| 4,895,231 A | 1/1990 | Yamaguichi et al. ....... 190/115 |
| 5,214,574 A | 5/1993 | Chang ........................ 361/680 |
| 5,260,884 A | 11/1993 | Stern .......................... 361/680 |
| 5,305,183 A | 4/1994 | Teynor ........................ 361/686 |
| 5,325,970 A | 7/1994 | Dillon et al. ............... 206/576 |
| 5,437,367 A | 8/1995 | Martin ........................ 206/320 |
| 5,448,446 A | 9/1995 | Honda et al. ............... 361/680 |
| 5,596,482 A | 1/1997 | Horikoshi ................... 361/683 |
| 5,647,484 A | 7/1997 | Fleming ..................... 206/576 |
| 5,868,794 A * | 2/1999 | Barkley et al. ................ 607/5 |
| 6,028,764 A | 2/2000 | Richardson et al. ........ 361/681 |
| 6,179,122 B1 * | 1/2001 | Moncrief et al. ........... 206/320 |
| 6,208,504 B1 | 3/2001 | Cho et al. ................... 361/683 |
| 6,442,018 B1 | 8/2002 | Dinkin ........................ 361/683 |
| 6,504,706 B2 * | 1/2003 | Stewart ....................... 361/681 |

* cited by examiner

Primary Examiner—Darren Schuberg
Assistant Examiner—Hung Van Duong
(74) Attorney, Agent, or Firm—Carl B. Horton, Esq.; Armstrong Teasdale LLP

(57) ABSTRACT

In order to provide an electronic device permitting a reduction in size or an expansion of its internal space while maintaining its mechanical strength, a structure having mechanical strength is integrally formed with hinges for fitting a lid-shaped display unit to a box-shaped body and a carrying handle projecting outward from the box-shaped body.

16 Claims, 7 Drawing Sheets

ELECTRONIC DEVICE

CROSS REFERENCE TO RELATED APPLICATIONS

This application claims the benefit of Japanese Application No. 2001-167669 filed Jun. 4, 2001.

BACKGROUND OF THE INVENTION

The present invention relates to an electronic device, and more particularly to an electronic device permitting a reduction in size or an expansion of its internal space while maintaining its mechanical strength.

FIG. 11 illustrates an example of structure of a conventional electronic device (for instance a laptop personal computer).

This electronic device is provided with a box-shaped body 10 housing electronic circuits, and a lid-shaped display unit 20 fixed to one side of the box-shaped body 10 with two hinges 71 and 72 to be opened and closed as a lid for the box-shaped body 10 and provided with a liquid crystal display 21.

Of the first hinge 71, a lid-side hinge plate 71a is fixed to the lid-shaped display unit 20, and a body-side hinge plate 71b is fixed to one side, near its leftmost end, of the box-shaped body 10.

Of the second hinge 72, a lid-side hinge plate 72a is fixed to the lid-shaped display unit 20, and a body-side hinge plate 72b is fixed to one side, near its rightmost end, of the box-shaped body 10.

Further, the body-side hinge plate 71b of the first hinge 71 and the body-side hinge plate 72b of the second hinge 72 are integrated with a reinforcing plate 80 provided within the box-shaped body 10, and constitute a mechanically strong structure.

In the structure of the conventional electronic device shown in FIG. 11, the reinforcing plate 80 narrows the internal space of the box-shaped body 10. Accordingly, there is a problem that, if it is attempted to expand the internal space of the box-shaped body 10 to accommodate electronic circuits, the entire device will have to be made larger.

On the other hand, if the reinforcing plate 80 is dispensed with, the internal space of the box-shaped body 10 will be expanded, but the lid-shaped display unit 20, which is relatively heavy, will have to be individually supported by the first hinge 71 and the second hinge 72 for the liquid crystal display 21, resulting in another problem of a substantial drop in mechanical strength.

SUMMARY OF THE INVENTION

Therefore, an object of the present invention is to provide an electronic device permitting a reduction in size or an expansion of its internal space while maintaining its mechanical strength.

In its first aspect, the present invention provides an electronic device comprising a box-shaped body housing electronic circuits as an electronic device, a lid-shaped display unit fitted to one side of the box-shaped body with a plurality of hinge mechanisms to be opened and closed as a lid for the box-shaped body and provided with a panel type display device, and a handle unit fitted to the box-shaped body to project outward from the side of the box-shaped body where the lid-shaped display unit is fitted, characterized in that the plurality of hinge mechanisms and the handle unit integrally constitute a structure having mechanical strength.

Since the electronic device in the first aspect has no reinforcing plate within the box-shaped body, the internal space of the box-shaped body is expanded. Therefore, the box-shaped body, even if reduced in size, can accommodate electronic circuits. Further, as the structure is integrally formed of the handle unit projecting outside the box-shaped body and the plurality of hinge mechanisms, sufficient mechanical strength can be maintained. Accordingly, a reduction in size or an expansion of its internal space is permitted while maintaining its mechanical strength.

In its second aspect, the invention provides the electronic device of the above-described c configuration, characterized in that the box-shaped body is a quadrilateral of which a first side through a fourth side are consecutive; the plurality of hinge mechanisms include two hinges including a first closer to the second side than the center of the first side hinge plates of the two hinges are planar, each fixed to the lid-shaped display unit; the body-side hinge plated of the first hinge is in an L shape extending from the first side to the second side of the box-shaped body and fixed to the box-shaped body; the body-side hinge plate of the second hinge is in an L shape extending from the side to the fourth side of the box-shape body and fixed to the box-shaped body; and the handle unit joined to a part of the body-side hinge plate of the first hinge extending to the second side and to another part of the body-side hinge play of the second hinge extending to the fourth side.

Since the electronic device in the second aspect uses the L-shaped hinges, corners of the box-shaped body can be reinforced. Therefore, not only the mechanical strength of supporting the lid-shaped display unit but also that of the box-shaped body can be reinforced.

In its third aspect, the invention provides the electronic device of the above-described configuration, characterized in that the handle unit is variable in angle to the box-shaped body.

Since the electronic device in the third aspect has a handle unit whose angle to the box-shaped body is variable, it can be enhanced in the convenience of use.

In its fourth aspect, the invention provides the electronic device of the above-described configuration, characterized in that the handle unit is variable at least in a range between an angle 0°, 0° being an angle that is parallel to an extended plane from the bottom face of the box-shaped body, and 110° to the bottom face side.

Since the electronic device in the fourth aspect permits variation of the angle of the handle unit in a range between an angle 0°, 0° being an angle that is parallel to an extended plane from the bottom face of the box-shaped body, and 110° to the bottom face side, the box-shaped body can be installed with part of the box-shaped body being lifted by the handle unit in a desired inclination.

In its fifth aspect, the invention provides the electronic device of the above-described configuration, characterized in that the handle unit has stable angles in a stepwise manner.

Since the handle unit of the electronic device in the fifth aspect has stable angles in a stepwise manner, the operation to vary the angle can be accomplished in an articulated way and accordingly facilitated. Also, any determined angle can be stabilized.

In its sixth aspect, the invention provides the electronic device of the above-described configuration characterized in that the handle unit is in an easy-to-carry shape suitable for carrying by hand.

The electronic device in the sixth aspect is made suitable for carrying by hand.

In its seventh aspect, the invention provides the electronic device of the above-described configuration characterized in that the handle unit is in a wall-fittable shape for fitting to a vertical wall surface.

The electronic device in the seventh aspect is made suitable for fitting to a wall surface.

In its eighth aspect, the invention provides the electronic device of the above-described configuration characterized in that the handle unit is in a cart-fittable shape for fitting to a wheeled cart.

The electronic device in the eighth aspect is made suitable for fitting to a cart.

In its ninth aspect, the invention provides the electronic device of the above-described configuration characterized in that the handle unit is in a stand-fittable shape for fitting to an upright stand.

The electronic device in the ninth aspect is made suitable for fitting to a stand.

In its 10th aspect, the invention provides the electronic device of the above-described configuration characterized in that two or more of the handle units differing in shape are mutually replaceable.

Since the electronic device in the 10th aspect permits replacement of handle units differing in shape, its convenience of use can be enhanced.

In its 11th aspect, the invention provides the electronic device of the above-described configuration characterized in that it has at least two different kinds of the handle units out of the easy-to-carry shape, the wall-fittable shape, the cart-fittable shape and the stand-fittable shape.

Since the electronic device in the 11th aspect permits choice of a handle unit in a suitable shape when it is to be carried by hand, fitted to a wall surface, fitted to a cart or fitted to a stand, its convenience of use can be enhanced.

In its 12th aspect, the invention provides the electronic device of the above-described configuration characterized in that the handle unit is fitted with a cushion material.

The electronic device in the 12th aspect is made easier to carry by hand, or more difficult to slip when placed stationarily, by the cushion material of the handle unit.

In its 13th aspect, the invention provides the electronic device of the above-described configuration characterized in that connectors are provided on the first side of the box-shaped body.

The electronic device in the 13th aspect makes it easier to protect the connectors with the handle unit.

In its 14th aspect, the invention provides the electronic device of the above-described configuration characterized in that the lid-shaped display unit can be held at any desired angle between an angle 0°, 0° being an angle at which it covers the top face of the box-shaped body, and in a position opened at 180°.

The electronic device in the 14th aspect enables the lid-shaped display unit to be held at an angle easy to look at.

In its 15th aspect, the invention provides the electronic device of the above-described configuration characterized in that the panel type display device is a liquid crystal display.

The electronic device in the 15th aspect makes it possible to reduce the thickness of the lid-shaped display unit.

In its 16th aspect, the invention the electronic device of the above-described configuration characterized in that the electronic device is an ultrasonic diagnostic apparatus.

Since the electronic device in the 16th aspect provides a portable ultrasonic diagnostic apparatus, the ultrasonic diagnostic apparatus can be enhanced in the convenience of use.

Therefore, an electronic device according to the present invention permits a reduction in size or an expansion of its internal space while maintaining its mechanical strength.

Further objects and advantages of the present invention will be apparent from the following description of the preferred embodiments of the invention as illustrated in the accompanying drawings.

DETAILED DESCRIPTION OF THE INVENTION

The present invention will be described in detail with reference to a mode of carrying it out illustrated in drawings. To add, this in no way limits the invention.

Figure 1:
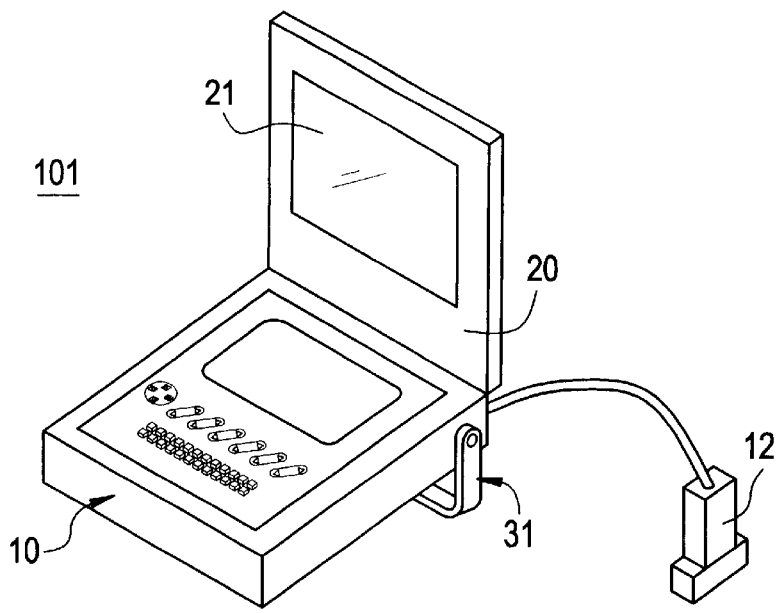
FIG. 1 is a perspective view illustrating an ultrasonic diagnostic apparatus pertaining to a mode of carrying out the present invention.

FIG. 1 is a configurational diagram illustrating an ultrasonic diagnostic apparatus pertaining to the mode of carrying out the invention.

This ultrasonic diagnostic apparatus 101 is provided with a box-shaped body 10 accommodating electronic circuits as an ultrasonic diagnostic apparatus, a lid-shaped display unit 20 fitted to one side of the box-shaped body 10 to be opened and closed as a lid for the box-shaped body 10 and provided with a liquid crystal display 21, a carrying handle (handle unit) 31 fitted to the box-shaped body 10 to project outward from the side of the box-shaped body 10 where the lid-shaped display unit 20 is fitted, and a probe 12 connected to a connector of the box-shaped body 10.

Figure 2:
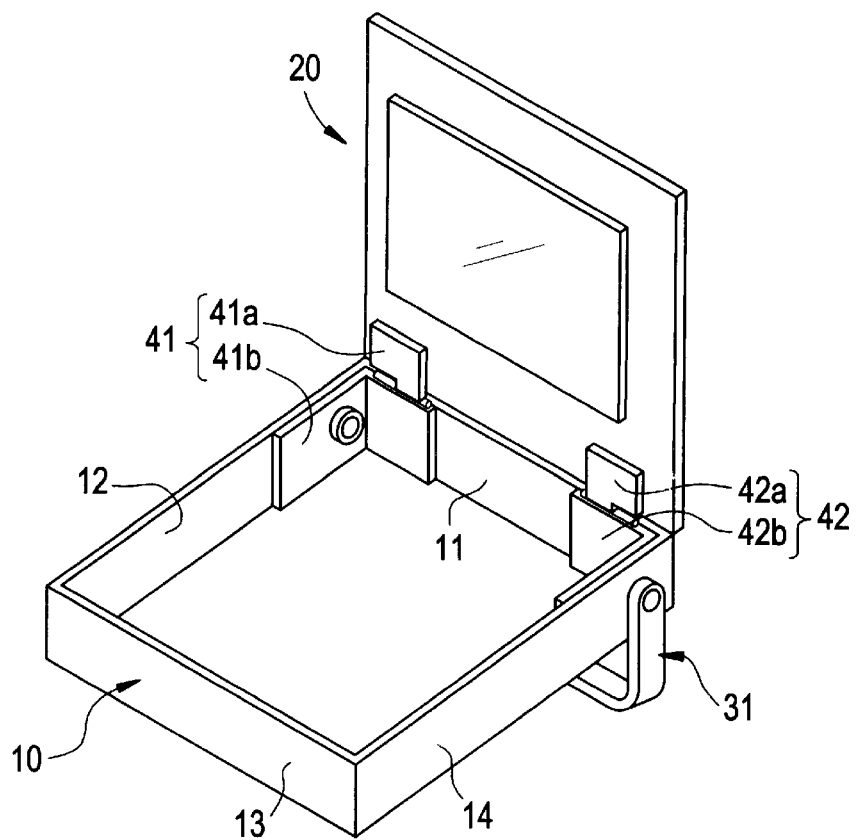
FIG. 2 is a perspective view illustrating the structure of the ultrasonic diagnostic apparatus pertaining to the mode of carrying out the invention.

FIG. 2 is a perspective view illustrating the structure of the ultrasonic diagnostic apparatus 101.

Of a first hinge 41, a planar lid-side hinge plate 41a is fixed to the bottom part, near its leftmost end, of the lid-shaped display unit 20, and an L-shaped body-side hinge plate 41b is fixed to a corner between a first side 11 and a second side 12 of the box-shaped body 10.

Of a second hinge 42, a planar lid-side hinge plate 42a is fixed to the bottom part, near its rightmost end, of the lid-shaped display unit 20, and an L-shaped body-side hinge plate 42b is fixed to a corner between the first side 11 and a fourth side 14 of the box-shaped body 10.

Further, a carrying handle 31 is fitted to the body-side hinge plate 41b extending to the second side 12 of the box-shaped body 10 and to the body-side hinge plate 42b extending to the fourth side 14 of the box-shaped body 10.

Figure 3:
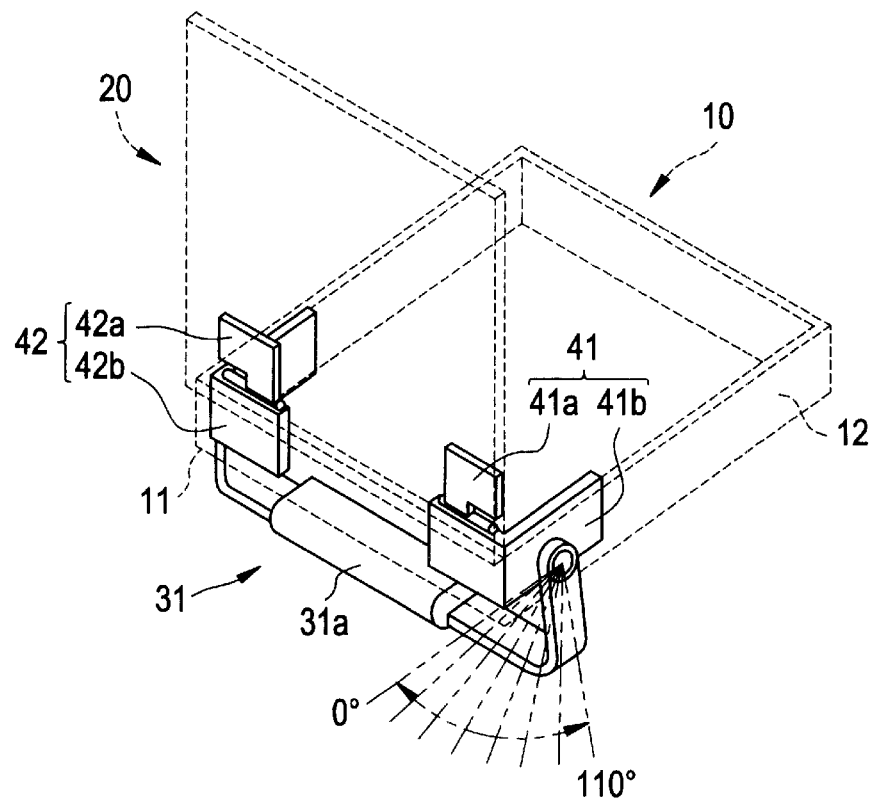
FIG. 3 is a perspective view illustrating the structure of the ultrasonic diagnostic apparatus pertaining to the mode of carrying out the invention from another angle.

FIG. 3 is a perspective view illustrating the structure of the ultrasonic diagnostic apparatus 101 as viewed from the corner between the first side 11 and the second side 12 of the box-shaped body 10.

The carrying handle 31 is variable in angle between an angle 0°, which is parallel to an extended plane from the bottom face of the box-shaped body 10, and 110° to the bottom face side, and its angular stability increases at every 5°.

Around the central part of the carrying handle 31 is wound a cushion material 31a.

Figure 4:
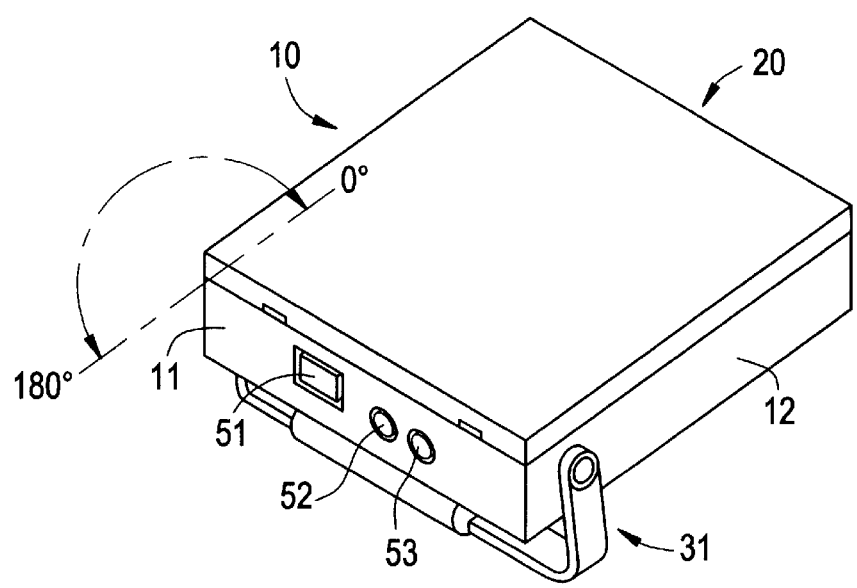
FIG. 4 is a perspective view illustrating connectors of the ultrasonic diagnostic apparatus pertaining to the mode of carrying out the invention.

FIG. 4 is a perspective view illustrating the external looks of the ultrasonic diagnostic apparatus 101 as viewed from the corner between the first side 11 and the second side 12 of the box-shaped body 10.

The lid-shaped display unit 20 can be held at any desired angle between an angle 0°, where it covers the top face of the box-shaped body 10, and in a position opened at 180°.

Further, a connector 51 for probing, a connector 52 for communication and a connector 53 for power supply are provided on the first side 11 of the box-shaped body 10.

Figure 5:
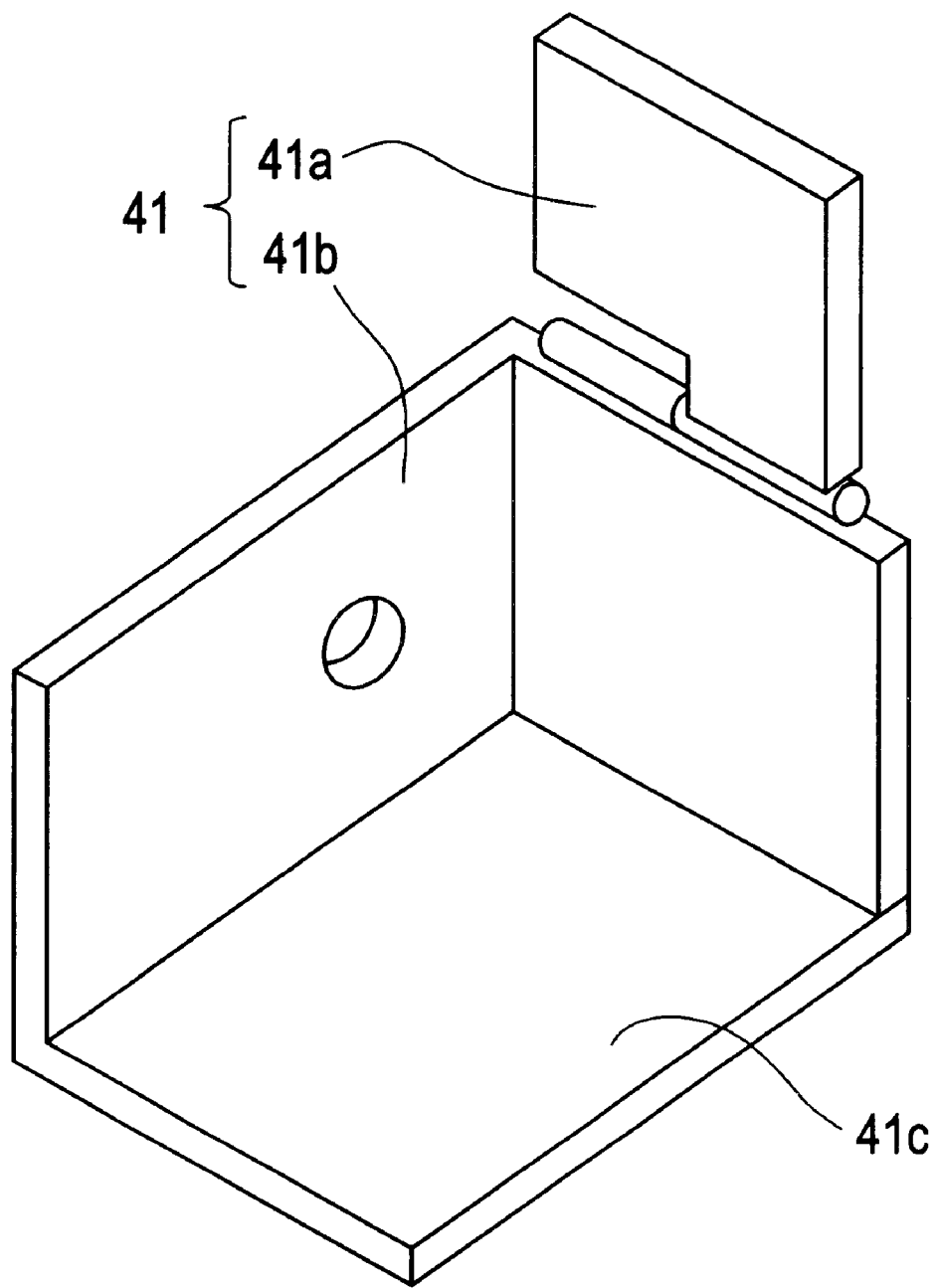
FIG. 5 is a perspective view illustrating a variation of a hinge.

FIG. 5 is a perspective view illustrating a variation of the first hinge 41.

As a reinforcing plate 41c is added, the mechanical strength can be increased.

Figure 6:
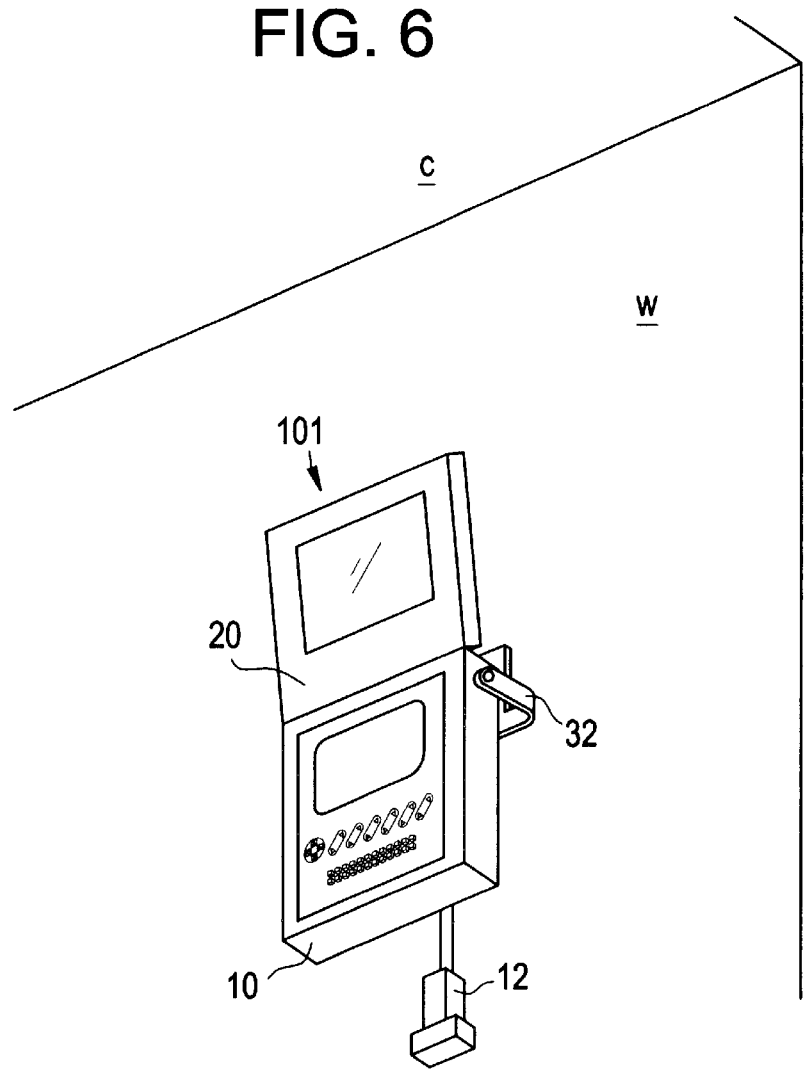
FIG. 6 is a perspective view illustrating a case in which the handle unit is replaced by a wall-hung handle.

FIG. 6 is a perspective view illustrating a state in which the handle unit is replaced by a wall-hung handle 32, which is fitted to a vertical wall W.

Figure 7:
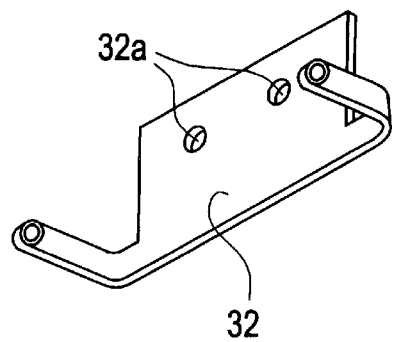
FIG. 7 is a perspective view illustrating the wall-hung handle.

As shown in FIG. 7, the wall-hung handle 32 has holes 32a for fastening bolts, with which the handle can be fitted to the wall W.

Figure 8:
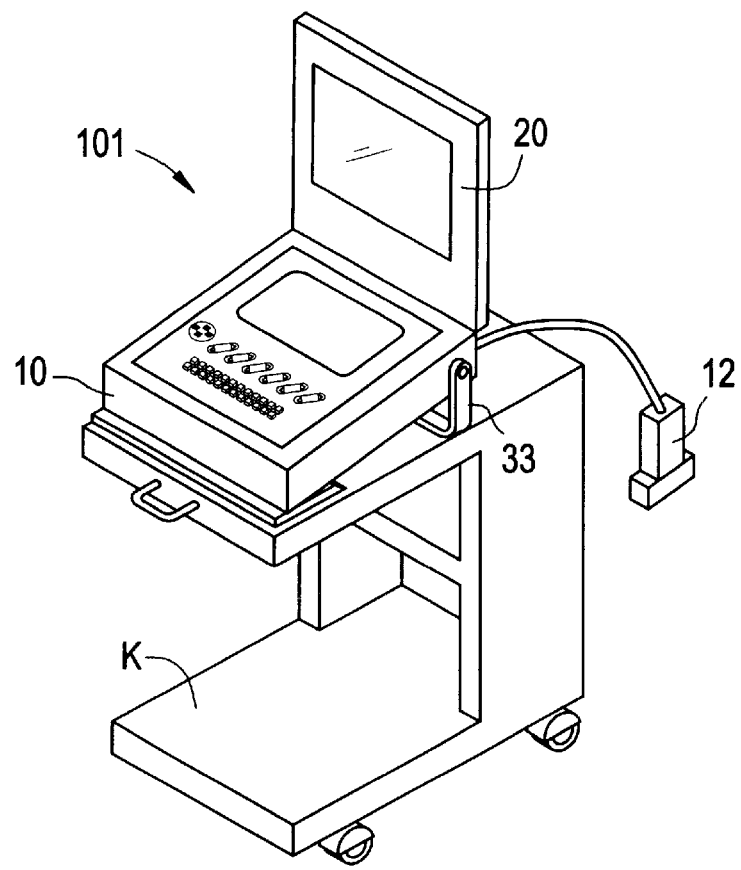
FIG. 8 is a perspective view illustrating a state in which the handle unit is replaced by a cart-mounting handle.

FIG. 8 is a perspective view illustrating a state in which the handle unit is replaced by a cart-mounting handle 33, which is fitted to a cart K.

Figure 9:
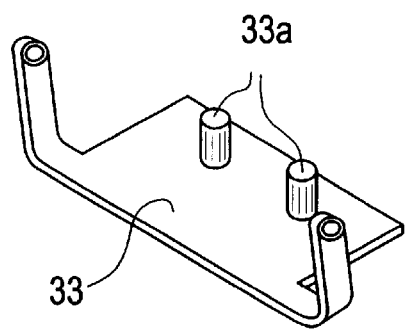
FIG. 9 is a perspective view illustrating the cart-mounting handle.

As shown in FIG. 9, the cart-mounting handle 33 is appended with fastening bolts 33a, with which it can be fitted to the cart K. To add, in the top face of the cart K are bored internally threaded holes to engage with the fastening bolts 33a.

Figure 10:
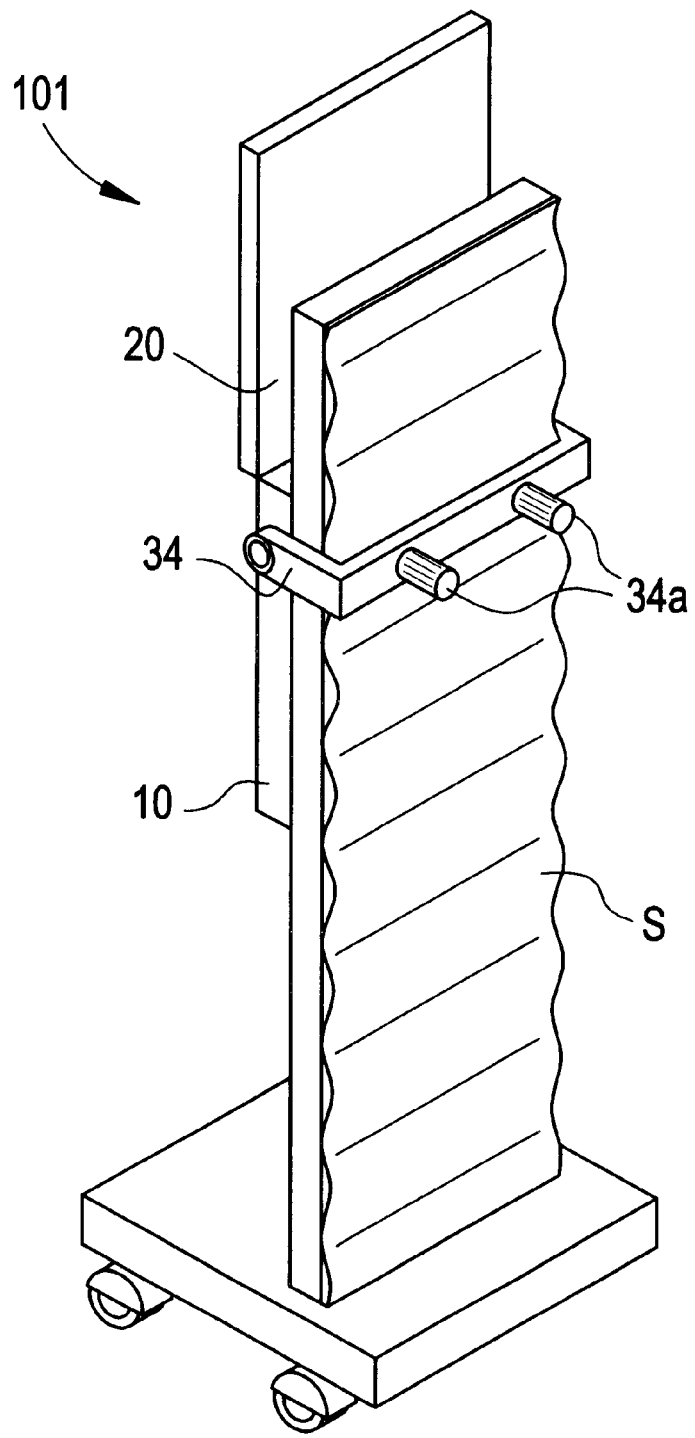
FIG. 10 is a perspective view illustrating a state in which the handle unit is replaced by a stand-mounting handle.
Figure 11:
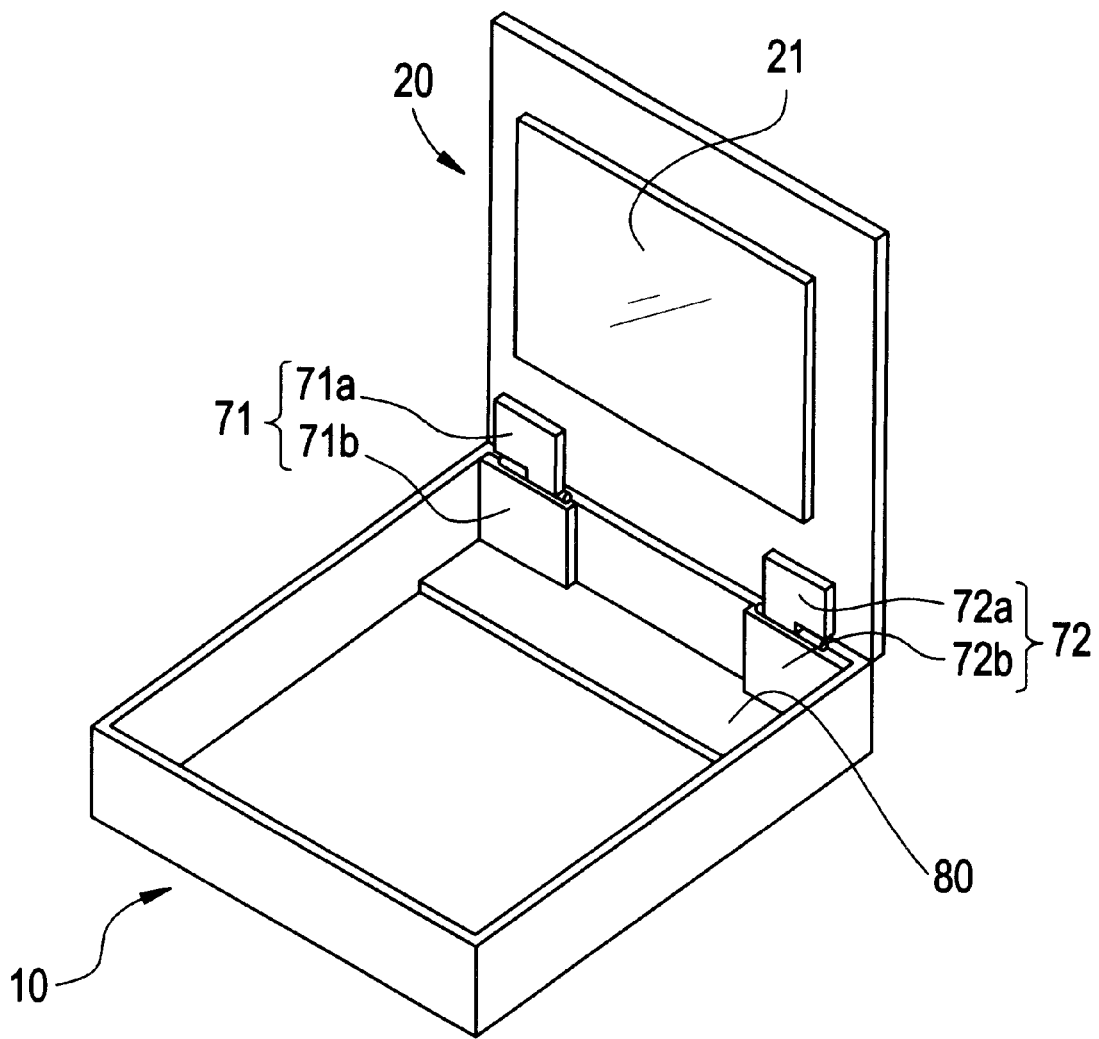
FIG. 11 is a perspective view illustrating the structure of an electronic device according to the prior art.

FIG. 10 illustrates a state in which the handle unit is replaced by a stand-mounting handle 34, which is fitted to a stand S.

The stand-mounting handle 34 is appended with fixing bolts 34a, with which it can be fitted to the stand S. To add, the rear face of the stand S are made rugged to facilitate stabile fixing with the fixing bolts 34a.

The above-described ultrasonic diagnostic apparatus 101 provides the following advantages.

(1) Since no reinforcing plate is arranged within the box-shaped body 10, the internal space of the box-shaped body 10 is expanded. Accordingly, electronic circuits can be accommodated even if the box-shaped body 10 is reduced in size. Furthermore, as the structure is integrally formed of a handle unit (any of 31 through 34) projecting outward from the box-shaped body 10 and hinges 41 and 42, sufficient mechanical strength can be maintained. Therefore, a reduction in size or an expansion of its internal space is permitted while maintaining its mechanical strength.

(2) As the L-shaped hinges 41 and 42 are used, corners of the box-shaped body 10 can be reinforced. Therefore, not only the mechanical strength of supporting the lid-shaped display unit 20 but also that of the box-shaped body 10 can be reinforced.

(3) As the angle of the handle unit (any of 31 through 34) is variable from an angle 0°, which is parallel to an extended plane from the bottom face of the box-shaped body 10, and 110° to the bottom face side, the box-shaped body 10 can be installed in any desired inclination.

(4) As the handle unit (any of 31 through 34) has a stable angle at 50 intervals, the operation to vary the angle can be accomplished in an articulated way and accordingly facilitated. Also, it can be stably supported at angles 0°, 5°, 10°, ..., 105° and 110°.

(5) Use of the carrying handle 31 is suitable for carrying by hand. If it is replaced with the wall-hung handle 32, it will become suitable for fitting onto a wall surface W. If it is replaced with the cart-mounting handle 33, it will become suitable for fitting to the cart K. If it is replaced with the stand-mounting handle 34, it will become suitable for fitting to the stand S.

(6) The cushion material 31a of the carrying handle 31 would contribute to the comfort of holding by hand. It would also prevent sliding when it is placed stationarily.

(7) By keeping the carrying handle 31 at an angle 0°, the connectors (51 through 53) can be protected.

(8) The lid-shaped display unit 20 can be held at any readily visible angle between an angle 0°, where it covers the top face of the box-shaped body 10, and an open angle of 180°.

Many widely different embodiments of the invention may be configured without departing from the spirit and the scope of the present invention. It should be understood that the present invention is not limited to the specific embodiments described in the specification, except as defined in the appended claims.

What is claimed is:

1. An electronic device comprising a box-shaped body housing electronic circuits as an electronic device, a lid-shaped display unit fitted to one side of said box-shaped body with a plurality of hinge mechanisms to be opened and closed as a lid for said box-shaped body and provided with a panel type display device, and a handle unit fitted to said box-shaped body to project outward from the side of the box-shaped body where the lid-shaped display unit is fitted, wherein said plurality of hinge mechanisms and said handle unit integrally constitute a structure having mechanical strength.

2. The electronic device, as set forth in claim 1, wherein said box-shaped body is a quadrilateral of which a first side through a fourth side are consecutive; said plurality of hinge mechanisms include two hinges including a first hinge closer to the second side than the center of the first side and a second hinge closer to the fourth side than the center of the first side; the lid-side hinge plates of the two hinges are planar, each fixed to said lid-shaped display unit; the body-side hinge plate of the first hinge is in an L shape extending from the first side to the second side of said box-shaped body and fixed to said box-shaped body; the body-side hinge plate of the second hinge is in an L shape extending from the first side to the fourth side of said box-shaped body and fixed to said box-shaped body; and said handle unit is joined to a part of the body-side hinge plate of the first hinge extending to the second side and to another part of the body-side hinge plate of the second hinge extending to the fourth side.

3. The electronic device, as set forth in claim 1, wherein said handle unit is variable in angle to said box-shaped body.

4. The electronic device, as set forth in claim 1, wherein said handle unit is in an easy-to-carry shape suitable for carrying by hand.

5. The electronic device, as set forth in claim 1, wherein said handle unit is in a wall-fittable shape for fitting to a vertical wall surface.

6. The electronic device, as set forth in claim 1, wherein said handle unit is in a cart-fittable shape for fitting to a wheeled cart.

7. The electronic device, as set forth in claim 1, wherein said handle unit is in a stand-fittable shape for fitting to an upright stand.

8. The electronic device, as set forth in claim 1, wherein two or more of said handle units differing in shape are mutually replaceable.

9. The electronic device, as set forth in claim 1, wherein said handle unit is fitted with a cushion material.

10. The electronic device, as set forth in claim 1, wherein connectors are provided on the first side of said box-shaped body.

11. The electronic device, as set forth in claim 1, wherein said lid-shaped display unit can be held at any desired angle between an angle 0°, 0° being an angle at which it covers the top face of the box-shaped body, and in a position opened at 180°.

12. The electronic device, as set forth in claim 1, wherein said panel type display device is a liquid crystal display.

13. The electronic device, as set forth in claim 1, wherein the electronic device is an ultrasonic diagnostic apparatus.

14. The electronic device, as set forth in claim 3, wherein said handle unit is variable at least in a range between an angle 0°, 0° being an angle that is parallel to an extended plane from the bottom face of the box-shaped body, and 110° to the bottom face side.

15. The electronic device, as set forth in claim 3, wherein said handle unit has stable angles in a stepwise manner.

16. The electronic device, as set forth in claim 8, wherein it has at least two different kinds of said handle units out of said easy-to-carry shape, said wall-fittable shape, said cart-fittable shape and said stand-fittable shape.

* * * * *